May 11, 1965
S. ARMSTRONG
3,182,547
MEANS FOR OBTAINING AN OPTICAL THIRD
DIMENSION IN MOTION PICTURES
Filed Feb. 9, 1961
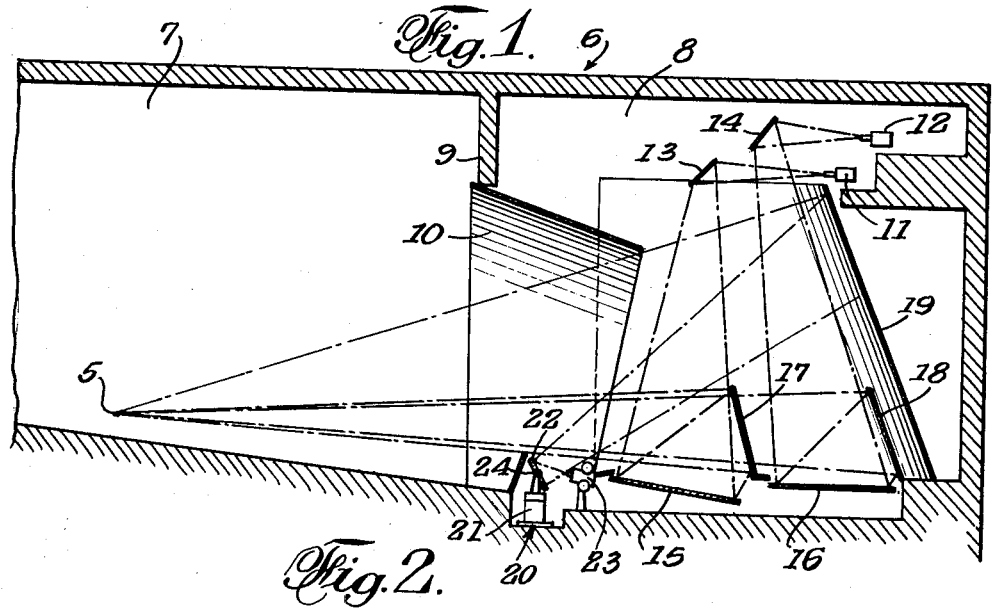
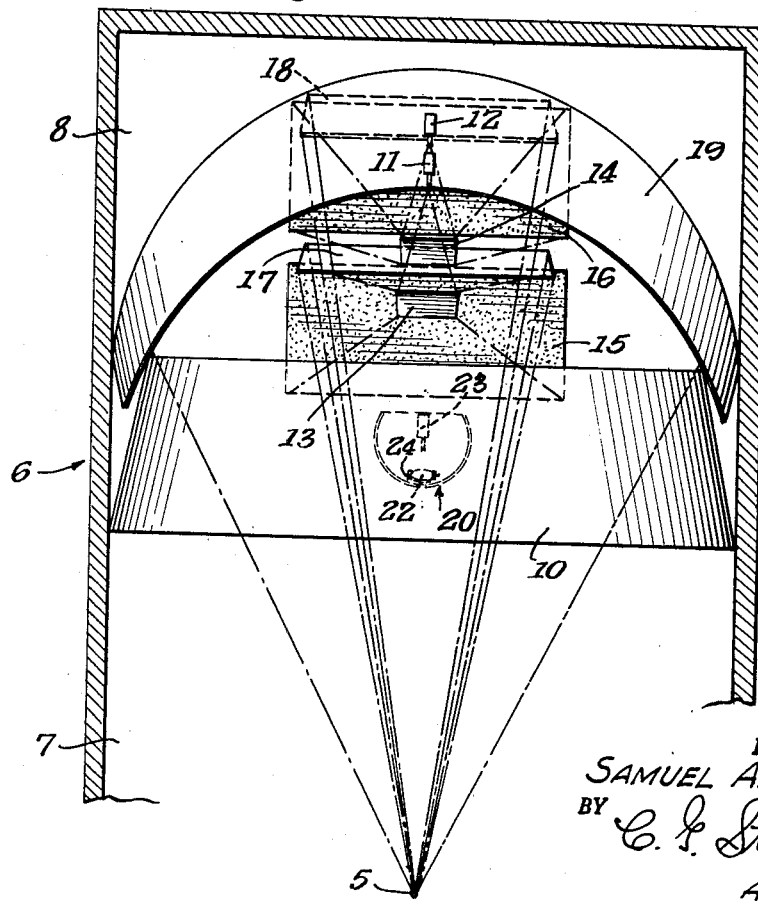
INVENTOR.
SAMUEL ARMSTRONG
BY C. P. Stratton
ATTORNEY

United States Patent Office 3,182,547
Patented May 11, 1965

3,182,547
MEANS FOR OBTAINING AN OPTICAL THIRD
DIMENSION IN MOTION PICTURES
Samuel Armstrong, P.O. Box 163, Encino, Calif.
Filed Feb. 9, 1961, Ser. No. 88,054
2 Claims. (Cl. 88—24)

This invention relates to a method and means for obtaining an optical third dimension in motion pictures, especially those exhibited in theatres. The present invention is an improvement of the method and means disclosed in my pending application Serial No. 8,743, filed February 15, 1960.

In the method and means in said pending application that deals with picture exhibition in a theatre or auditorium, the viewer is provided with a composite picture that gives the illusion of such depth as to appear to place said viewer in the locale of the scene being exhibited, as well as presenting to the viewer a moving scene of such depth perception that the dramatis personae, in varying degrees of depth, are displayed in spaced relation to the background in which the action takes place.

The present invention has for an object to improve a picture projecting method and means, as above, by providing close proximity to each other of the projection components of the invention to thereby greatly increase the three-dimensional effect. By arranging the screen and partial mirrors of the present means in close proximity, light losses are minimized and efficiency of operation thereby increased.

Another object of the invention is to provide a method and means, as above, that is accomplished entirely backstage, i.e., behind the proscenium arch, thereby obviating the need for projectors or booths in the auditorium portion of the theatre. Thus, seating capacity is maintained at a maximum as well as improving the quality of the picture being exhibited.

This invention also has for its objects to provide a novel, economical and convenient method or process of superior utility, and to provide apparatus that is positive in operation, convenient in use, easily installed in working position and easily disconnected therefrom, economical of manufacture, relatively simple, and of general superiority and serviceability.

The invention also contemplates novel combinations of method steps as well as novel details of construction and novel combinations and arrangements of parts, which will appear more fully in the course of the following description, which is based on the accompanying drawing. However, said drawing merely shows and the following description merely describes, the invention with respect to a preferred method and apparatus, the same, nevertheless, being given by way of illustration or example only.

In the drawing, like reference characters designate similar parts in the several views.

FIG. 1 is a longitudinal sectional view of a theatre showing the present improved means for the simultaneous presentation to the viewer of previously produced motion picture films of the dramatis personae and background of the picture.

FIG. 2 is a plan sectional view thereof with portions of the theatre structure omitted.

The present method or process entails the production of two separate films for each dramatic action, one for the principal actors or characters in the foreground and the other with the supporting actors or characters in the background. Both these films are taken against an unlighted black background and the same, in addition to the actors, may picture props incidental to the scene and which may be in a fore or remote position, as desired. These two films are preferably wide screen films regardless which of the various such film processes are adopted. Therefore, the present process includes the provision of so-called foreground and background films, each separately photographed before a light-absorbing background or any background that photographs black on said films.

The present method also entails the production of an independent film or films for providing background pictures to accompany the action above described.

In connection with the above, the means to provide the effects above may be combined with still picture projection, as disclosed in said prior application but which are here omitted as being repetitious.

The above-mentioned films of dramatis personae and background are, according to the present invention, simultaneously projected by projectors backstage or, at least, beneath or behind the proscenium arch so the same are closely associated for minimum light dissipation. Projection of said films in superimposition on means also backstage or, at least, beneath or behind the proscenium arch, produces the desired three-dimensional effects, as referred to above. The means for providing a viewer 5 in a theatre or auditorium 6 with the optical or visual effects of such projection is illustrated in the present drawing.

The theatre 6 has the usual auditorium 7 in which the viewer 5 is seated, and a backstage area 8. The usual proscenium arch 9 divides the auditorium from the backstage area. An auxiliary proscenium arch 10 may be provided, the same being shown as of substantial depth and conically tapering toward the area 8. It is this auxiliary arch that may be illuminated by still pictures to set the environment of the play action presented backstage.

The present improvements comprise, generally, a first projector 11, and a second projector 12 disposed in the flies of the stage area 8, one in front of the other; a first full reflecting mirror 13 receiving the image from projector 11 and reflecting the same downwardly along a projection path toward the floor of the back stage area, and a second and similar reflecting mirror 14 receiving the image from projector 12 and also reflecting the same downwardly along a projection path to the rear of the reflection of mirror 13; a first solid screen 15 in or near the floor of the stage and upon the upper face of which said reflected image from mirror 13 is received and a second solid srceen 16 rearward of the screen 15 to receive on its upper face the reflected image from mirror 14; a first partial mirror 17 rearward of the screen 15 and above the stage floor and so tilted as to receive the image that is on screen 15 and transmit the same along an angularly upward and rearward transmission path shorter than the projection paths and to reflect the same toward the observer 5, and a similar partial mirror 18 above and rearward of the screen 16 to receive the image that is on screen 16 and transmit the same along an angularly upward and rearward transmission path shorter than the projection paths and to reflect the same, through the partial transparency of mirror 17, toward the observer 5; a translucent screen 19 forming a rear encircling background for the images on mirrors 17 and 18 and extending to a height whereby its upper edge is hidden from the observer by the auxiliary proscenium arch 10; and means 20 to project background pictures or effects on the screen 19.

The mirrors 13 and 14 may be omitted if projection of the projectors 11 and 12 can be arranged to be downward instead of generally horizontally, as shown.

The screens 15 and 16 provide picture images that may be "seen" by the partial mirrors. Therefore, the latter may be located and angled to provide the best transmission to the observer 5 even though a slight change in the shape of the images on the screens 15 and 16 may result. In any case, the screens may be set at angles greater than the angles shown to minimize proportion changes in the images, as above mentioned.

The back screen 19 need not be translucent if lighted from the front but is made of translucent sheet material so as to present background images to the observer 5 projected from the rear.

The means 20 may take various forms to project images upon the front face of the back screen 19. In the present case, the same is shown as a housing 21 that carries a full mirror 22 that receives a still or moving picture from a projector 23. It will be evident that the mirror can be set on a pivot 24 to project said picture onto screen 19 and that by rotating or oscillating the mirror mount around a vertical axis, the picture so projected may sweep across the back screen. Thus, special sky effects, live action or animation, may be combined with the action seen by the observer 5, as reflected by mirrors 17 and 18.

By means of the described apparatus, the observer views the action, scenes and special effects partly directly, partly through the front partial mirror 17, and partly through the rear partial mirror 18.

Proportioning of the intensity of lighting on the different pictures here combined to give the three-dimension effect, may be varied so that the front images of mirror 17 optically override the other images and that the images of mirror 18 optically override the images on screen 19. In this manner depth perception is provided by the present means. Because of the compact backstage arrangement of the parts with resultant minimum light dissipation, the effects desired are greatly improved.

The present organization is dependent, largely, on the use of high efficiency partial mirrors 17 and 18. Such mirrors have such little light loss as to be practically one-hundred percent efficient with forty-two percent reflection and fifty-eight percent transmission or transparency. One of the properties of such high efficiency partial mirrors is that if pictures were projected directly upon them, no image would be visible. Dramatic action can only be seen in said mirrors as a reflected image. In other words, the present invention comprises the combination of such mirrors 17 and 18 with their respective screens 15 and 16, to present to the audience, as represented by the observer 5, a three-dimensional effect, as set forth above.

While the foregoing illustrates and describes what is now contemplated to be the best mode of carrying out the invention with respect to both the method and apparatus, the same is, of course, subject to modification without departing from the spirit and scope of the invention. Therefore, it is not desired to restrict the invention to the particular method steps or combination or sequence of steps described, nor to the particular form of construction illustrated and described, but to cover all equivalents or modifications of method and apparatus that may fall within the scope of the appended claims.

Having thus described the invention, what is claimed and desired to be secured by Letters Patent is:

1. Apparatus for producing a composite image entirely behind the proscenium arch of a theatre and transmitting the same to an observer located in the auditorium of said theatre, said apparatus comprising two screens disposed on the stage side of said arch, one forward of the other in a line to said observer, means above said screens to downwardly project a separate picture to each screen, two partial mirrors rearwardly offset from said screens, one of said mirrors being forward of the other in a line to said observer and, respectively, partially reflecting said images on the screens to the observer along a coincidental path whereby the observer sees the reflection of the forward mirror directly and the reflection of the rearward mirror through the partial transparency of the forward mirror, said screens being disposed substantially horizontally below the line of vision of the observer, and the partial mirrors being disposed in forwardly inclined vertical positions with one mirror between the two screens and the other rearward of the rearward screen.

2. Apparatus for producing a composite image entirely from behind a proscenium arch structure of a theatre and transmitting the same to an observer located in the auditorium of said theatre, said apparatus comprising two substantially horizontally disposed screens on the stage side of the arch, one forwardly of the other in a line to the observer, means above the top of the proscenium arch structure and remote from said screens to project downwardly a separate picture to each screen, a partial mirror positioned rearwardly of each screen, each mirror being angularly disposed with respect to its adjacent screen for receiving from the screen a reflection of the picture, the angle of said partial mirrors being such as to present to an observer located in the auditorium the reflection of the picture from the screens, whereby the observer sees the reflection of the forward mirror directly and the reflection of the rearward mirror through the partial transparency of the forward mirror, a translucent screen forming a rear encircling background for the images of the mirrors, and means to project background pictures on said last-named screen.

References Cited in the file of this patent
UNITED STATES PATENTS

| | | |
|---|---|---|
| 2,002,498 | Basson | May 28, 1935 |
| 2,100,634 | Coffey | Nov. 30, 1937 |
| 2,336,508 | Smith et al. | Dec. 14, 1943 |
| 2,952,182 | Marks et al. | Sept. 13, 1960 |

FOREIGN PATENTS

| | | |
|---|---|---|
| 147,540 | Great Britain | Dec. 9, 1920 |
| 186,898 | Great Britain | Mar. 15, 1923 |
| 937,781 | France | Aug. 26, 1948 |
| 1,196,308 | France | May 25, 1959 |